United States Patent
Achan et al.

(10) Patent No.: US 7,877,404 B2
(45) Date of Patent: Jan. 25, 2011

(54) QUERY CLASSIFICATION BASED ON QUERY CLICK LOGS

(75) Inventors: Kannan Achan, Mountain View, CA (US); Ariel Fuxman, San Jose, CA (US); Rakesh Agrawal, San Jose, CA (US); Panayiotis Tsaparas, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 12/042,531

(22) Filed: Mar. 5, 2008

(65) Prior Publication Data

US 2009/0228353 A1 Sep. 10, 2009

(51) Int. Cl.
G06F 17/30 (2006.01)

(52) U.S. Cl. ...................... 707/768; 707/737
(58) Field of Classification Search ................ 707/1–7, 707/10, 100–102, 103 Y, 103 Z, 104.1, 602, 707/603, 672, 713, 737, 740, 768
See application file for complete search history.

(56) References Cited

U.S. PATENT DOCUMENTS

| | | | | |
|---|---|---|---|---|
| 7,603,348 B2 * | 10/2009 | He et al. | | 1/1 |
| 7,610,282 B1 * | 10/2009 | Datar et al. | | 1/1 |
| 7,610,313 B2 * | 10/2009 | Kawai et al. | | 1/1 |
| 2004/0249796 A1 * | 12/2004 | Azzam | | 707/3 |
| 2005/0060290 A1 | 3/2005 | Herscovici | | |
| 2005/0197829 A1 | 9/2005 | Okumura | | |
| 2006/0004850 A1 | 1/2006 | Chowdhury | | |
| 2006/0206516 A1 | 9/2006 | Mason | | |
| 2006/0218115 A1 | 9/2006 | Goodman | | |
| 2007/0078822 A1 | 4/2007 | Cucerzan | | |
| 2007/0112764 A1 | 5/2007 | Yih | | |
| 2007/0143278 A1 | 6/2007 | Srivastava | | |
| 2007/0299815 A1 | 12/2007 | Starbuck | | |
| 2008/0059508 A1 * | 3/2008 | Lu et al. | | 707/102 |
| 2008/0201219 A1 * | 8/2008 | Broder et al. | | 705/14 |

OTHER PUBLICATIONS

Abhishek Keyword Generation for Search Engine Advertising using Semantic Similarity between Terms May 8, 2007 http://www2007.org/workshops/paper_87.pdf.
Davison Searching the Web and More a Juxtaposition of Online Search Traces Jan. 10, 2008 http://www.cse.lehigh.edu/~brian/pubs/2005/query-analysis/LU-CSE-05-005.pdf.
Wen Query Clustering Using User Logs Jan. 2002 https://research.microsoft.com/users/jrwen/jrwen_files/publications/QC-TOIS.pdf.

* cited by examiner

Primary Examiner—Cam-Linh Nguyen
(74) Attorney, Agent, or Firm—Shook Hardy & Bacon LLP (57) ABSTRACT

Methods are provided for the classification of search engine queries and associated documents based on search engine query click logs. One or more seed documents or queries are provided that contain content that is representative of a category. A query click log containing information regarding queries entered by at least one user into the search engine and documents subsequently clicked in search engine results corresponding with the queries is analyzed to determine which one or more queries resulted in clicks on the seed documents. Information is stored associating the one or more queries with the category if they resulted in clicks on the seed documents.

16 Claims, 7 Drawing Sheets

QUERY CLASSIFICATION BASED ON QUERY CLICK LOGS

BACKGROUND

Search engine operators receive search queries from users, and in return provide the users with search results that are, hopefully, relevant to the user's query. To account for ambiguous or misspelled queries, or to provide the users with more relevant search results, attempts are often made to classify the queries entered by a user and the uniform resource locators (URLs) subsequently clicked on. The process of query classification attempts to assign the queries and URLs to a particular category that is representative of the content for which the user is searching. If a query is properly assigned to a category, more relevant and accurate search results may be presented to the user.

Additional uses of query and URL classification deal with the presentation of advertisements to user in conjunction with search results. Often referred to as sponsored search results, they are widely utilized by advertisers to target advertisements to users based on queries entered by the users into search engines. Operators of search engines position advertisements of an advertiser in conjunction with search results displayed to a user. Specific sponsored search results are displayed to users based on the content of the query they entered into the search engine, typically referred to as keywords. For instance, a user who enters a query for "Hawaii trip" could be presented with advertisements for a vacation package to Hawaii.

Advertisers typically desire to purchase a range of relevant keywords that their advertisements will be displayed in conjunction with in order to extend the reach of their advertising campaigns. Query classification provides an improved method of generating keywords by classifying queries based on the content they reference.

SUMMARY

Embodiments of the invention are directed to method of query classification. In one embodiment, one or more seed documents are received that correspond to a category. At least one query click log containing information regarding queries entered by at least one user into at least one search engine and documents clicked in search results corresponding to the queries is received as well. A determination of one or more queries that resulted in at least one click on the one or more seed documents is made, based on information contained in the at least one query click log. Alternative embodiments of the invention repeat this process iteratively to determine additional queries to associate with the category. In some embodiments, a list of keywords is generated for the category based on the queries assigned to the category. In other embodiments, the query classification may be employed to facilitate providing search results. Different embodiments of the invention determine a probability that the queries or URLs correspond to the category and assign the queries or URLs to the category if the probability is within a predefined range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless, and except, when the order of individual steps is explicitly described. Figures below will use like numbers when possible in order to show similarities and differences from figure to figure.

Embodiments of the present invention are directed to, among other things, the classification of queries and URLs from search engine query click logs. The classification of query click logs involves the assignment of a query or a URL to a particular category. The category generally defines the subject matter that a user was seeking when they issued the query to the search engine.

One practical application of query classification is in the facilitation of searching based on the resulting classification. For instance, once a query is properly classified, the classification may used in the generation of search results in response to the query. Search results may be returned that are relevant only to the category of the classified query. Or, if the query is ambiguous in nature such that a single definitive category can not be determined, but multiple classifications may be determined, search results consistent with those multiple classifications may be returned.

Another practical application of query classification is the generation of keywords based on the classified queries. Keywords are used by an advertiser desiring to present advertisements to users of a search engine in conjunction with search results. Rather than indiscriminately presenting the advertisement to all users of a search engine, it is desirable to target the advertisement to those users who may be more inclined to purchase the goods or services promoted by the advertisement. This is accomplished by the use of keywords.

Keywords are words or short phrases that a user may enter as a query into a search engine when searching for a particular category. In one example, a particular category may be "shoes." Obvious keywords for that category would be "running shoes," for example. A retailer of shoes would then want to target their advertisements to users who were searching for the category of shoes. In order to do this, a relevant list of keywords must be generated. These keywords would be words and phrases that a user would typically enter into a search engine when they were searching for the category of shoes.

While obvious keywords may be generated manually, advertisers often desire to present their advertisements to as many users as possible as long as there is a high enough probability that the users are actually searching for the category. In one embodiment of the invention, search engine query click logs are used in the generation of keywords. Query click logs define the queries entered by users into a search engine, and the respective URLs that a user clicked on in the results to the query. These URLs are hereinafter referred to as documents. For instance, a user query for "shoes," and subsequent click on the document "shoes.com," would represent one entry in the query click log. The query click logs may contain multiple clicks for each query in some embodiments of the invention.

The method of query classification is provided in one embodiment of the invention. One or more seed documents are received that correspond to a category. A query click log is then received that contains information regarding queries entered by at least one user into at least one search engine and documents clicked in search engine results corresponding with the queries. Based on the information contained in the query click log, one or more queries that resulted in at least one click on the one or more seed documents are determined. Information is then stored associating the queries to the category.

In other embodiments of the present invention, a seed set is received that contains seed documents that correspond to a category. A query click log as described above is received, and then a determination is made based on the information contained in the query click log of which one more queries results in clicks to the seed documents. The queries that resulted in clicks on the seed documents are then assigned to the category. In cases where a query may have resulted with clicks on multiple, differing seed documents, a query may be assigned to multiple categories based on the probability that a query likely corresponds to category. An additional determining step is performed, wherein the one or more documents that were clicked as search results to the one or more queries assigned to the category are identified. It is then determined, based on the information contained in the query click logs, the one or more additional queries that results in clicks to the one or more other documents. The one more additional queries are assigned to the category.

In alternative embodiments of the invention, an additional step of determining the probability that the additional queries correspond to the category may be performed. Additional queries may only be assigned to the category if the determined probability is within a predefined range. The step of analyzing the query log may also be repeated until a predefined probability is reached.

Having briefly described an overview of embodiments of the present invention, an exemplary operating environment suitable for implementing embodiments hereof is described below.

Figure 1:
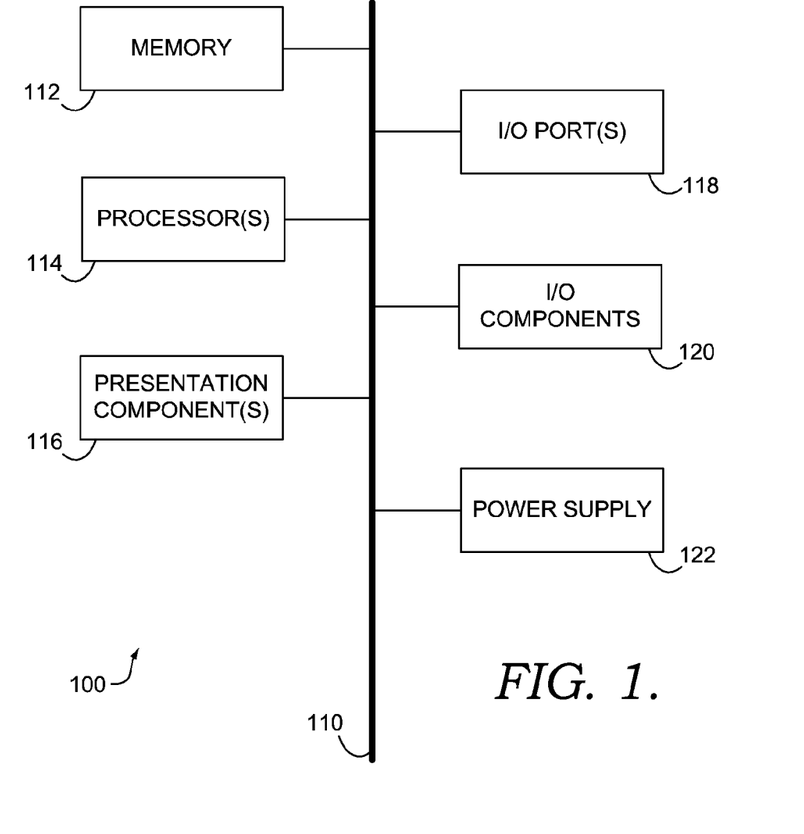
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventor recognizes that such is the nature of the art, and reiterates that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
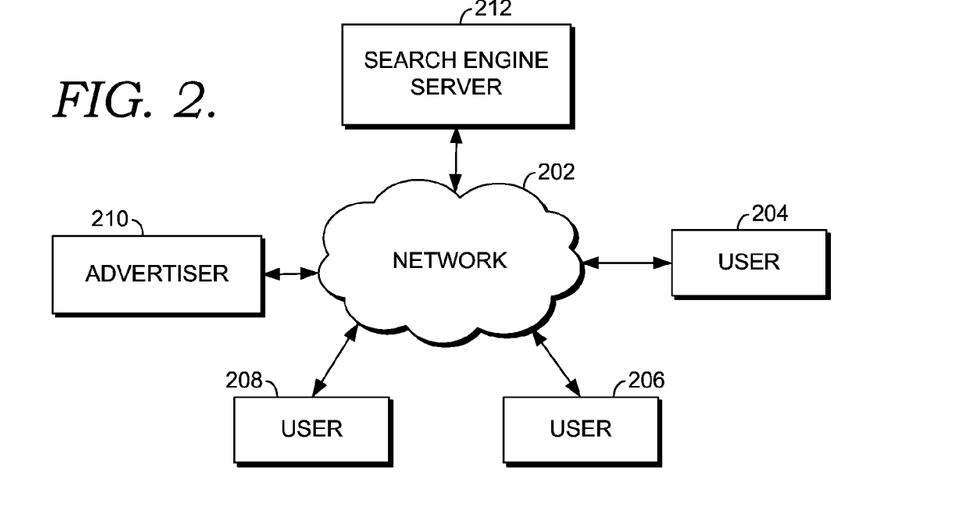
FIG. 2 is a system diagram depicting an exemplary system for user and advertiser interactions with a search engine according to one embodiment of the present invention.

Turning now to FIG. 2, a block diagram is provided that illustrates an exemplary system for user and advertiser interactions with a search engine according to one embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system may include a search engine server 212, a first user device 204, a second user device 206, a third user device 208, and an advertiser 210. The user devices 204, 206, and 208 and advertiser 210 and search engine server 212 are all communicatively coupled together by the network 202. One skilled in the art will recognize that there are a variety of communication methods that may encompass network 202, including but not limited to: the internet, analog telecommunications network, private data networks, and cellular type networks. Common to all of these networks is their ability to facilitate the transmission of data and information between the search engine server 212 and the advertiser 210 and the user devices 204, 206, and 208. It should be understood that any number of user devices and advertisers 210 and search engine servers 212 may be employed within the system within the scope of embodiments of the present invention. Additionally, other components not shown may also be included within the system.

The user devices 204, 206, and 208 depicted in FIG. 2 are utilized by regular human users in the ordinary understanding of the term in one embodiment of the invention. The ordinary human users (hereinafter referred to as "users") are able to input information into their respective user devices 204, 206, and 208. They are also able to receive outputted information from their respective user devices 204, 206, and 208, respectively. In some embodiments, the user devices 204, 206, and 208, may be one of the following: a personal computer, a handheld computer, a personal digital assistant (PDA), a cellular telephone, or any other device that would permit input and output of information with a human user.

In some embodiments of the present invention, users pose search queries to a search engine server 212 through their respective user devices 204, 206, and 208. The results to those queries are then transmitted over the network 202 to the users through their respective user devices 204, 206, and 208. An advertiser 210 may communicate with the search engine server 212 through the network 202. The search engine server 212 may likewise communicate with the advertiser 210 over the network 202.

Users 204, 206, and 208 may issue queries to the search engine server 212 through their respective user devices and the network 202. The search engine server 212 then returns search results to the users 204, 206, and 208 through the network 202 and the respective user devices of the users. The search engine server 212 also stores the queries issued by the users 204, 206, and 208, and the resulting documents that the users 204, 206, and 208 click on in the search results. This information is stored in the form of a query click log. Entries may be organized in the query click log by the particular queries entered by users. Additionally, the frequency with which users click on a document in response to a query may be recorded as well in the query click logs. Multiple query click logs may be stored by the search engine server 212, and although not shown in FIG. 2, the query click logs may stored and generated by a third party. The search engine server 212 may also perform the task of classifying the queries based on the query click logs, and assigning the queries to a particular category that is descriptive of their content. In alternative embodiments, the classification may occur on a separate server affiliated with the search engine server 212. The search engine server 212 may also generate keywords for particular categories based on the classifications of the queries. In other embodiments of the invention, the generation of keywords for particular categories may occur on a separate server affiliated with a third party, and not the search engine server 212.

The advertiser 210 may communicate with the search engine server 212 to request a list of keywords associated with a category. The advertiser 210 may communicate advertisements to the search engine server 212 to display in search results to users 204, 206, and 208 when a keyword is issued to the search engine server 212 as a query.

Figure 3:
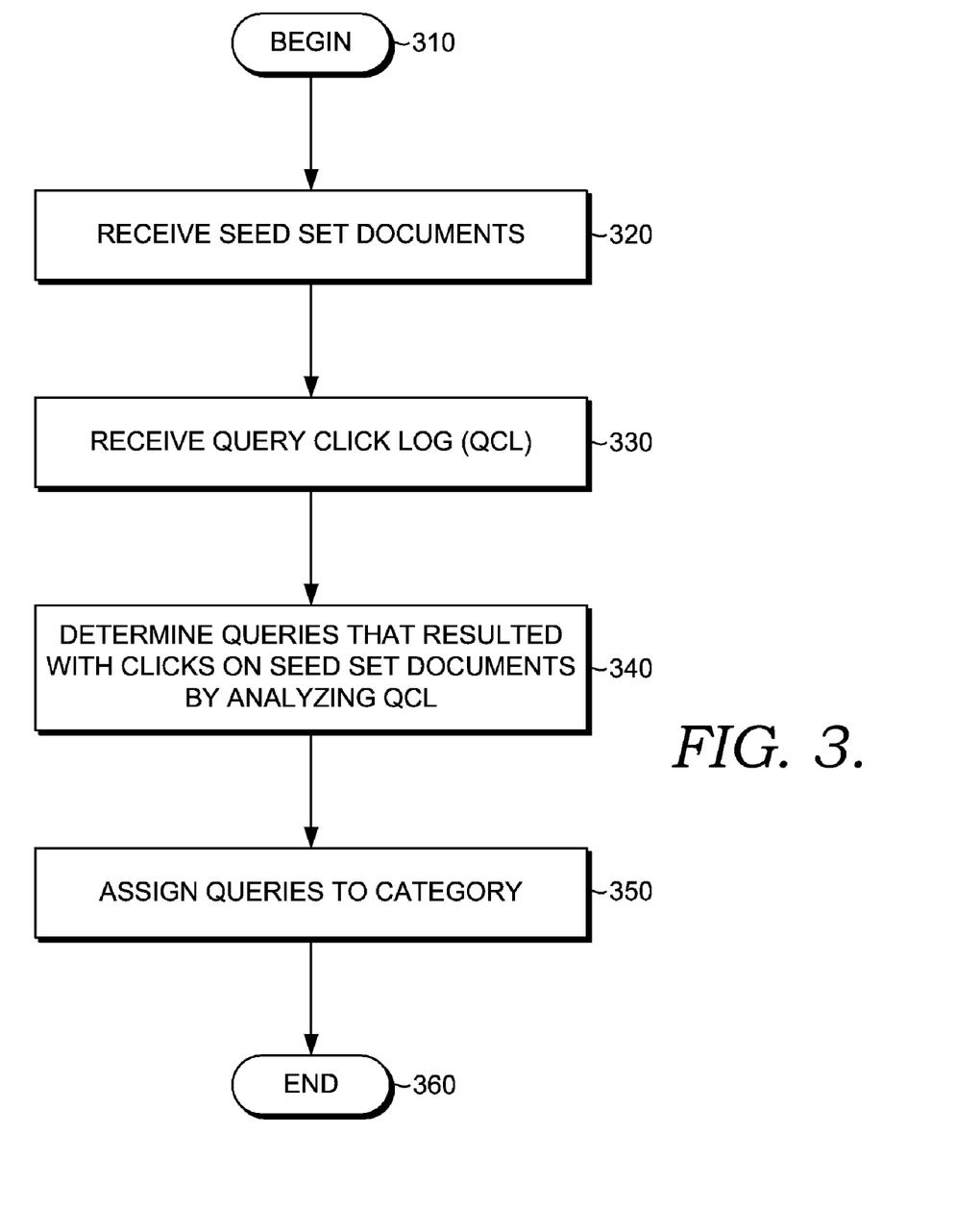
FIG. 3 is a flow diagram showing a method for analyzing a query click log to determine queries that resulted with clicks on seed documents according to one embodiment of the present invention.

Turning now to FIG. 3, a flow diagram is provided illustrating a method of query classification in accordance with one embodiment of the present invention. In this embodiment, the method begins at block 310. Seed set documents are received at step 320. Seed set documents may be documents that are known to be representative of a particular category. For instance, if the category were "shoes," one or more documents associated with the domain "shoes.com" could serve as seed documents. In this example, documents from the domain "runningshoes.com" could also serve as seed documents.

Although not depicted in FIG. 3, seed queries may also be received at step 320. Seed queries are similar to seed documents in that they are representative of a category. In the examples presented above for the category of shoes, the query of "walking shoes" could be a representative seed query. In some embodiments, seed queries and/or seed documents for a category may be specified by an advertiser. In alternative embodiments, seed documents and/or seed queries may be received from an advertising service that suggests them to an advertiser, or they may be generated by a search engine service. In some embodiments, the advertiser may specify one or more domains, and documents from those domains serve as seed documents. In further embodiments, a directory structure of documents associated with various categories may be provided, and documents from a selected category may be used as seed documents. In addition, the seed documents and queries may be generated by any number of methods not disclosed herein.

At block 330, a query click log is received. A query click log is a file that contains queries entered by at least one user and the subsequent links that were clicked in the search results in response to the queries. These links are referred to herein as documents. Query click logs may contain references to clicks on multiple documents for each query, such that one query is associated with more than one document. A query click log may also contain a field representing how many times a user clicked on a particular document in response to a query. In one embodiment, the query click log may also contain the queries of a plurality of users, and be organized in such a fashion as queries are represented in aggregate and not attributed to a particular individual user. In this embodiment a query click log would then contain three fields for each query, the first field would be the query itself, the second would be the documents clicked on in response to query, and the third would indicate how many times each document was clicked in response to the query. In alternative embodiments, a plurality of query click logs may be received in block 330.

At block 340, the query click log is analyzed to determine which queries resulted with clicks on the seed set documents received in block 320. This is accomplished by comparing the seed set documents to documents that that were clicked in response to the queries in the query click logs. In one embodiment, if the seed set documents and the documents clicked in response to queries are identical, the queries are deemed to be representative of the category and are assigned to the category in block 350. The remaining queries and their respective entries in the query click log that did not result in a click on a seed set document are determined to not be representative of the category, and are therefore not assigned to the category. In this embodiment, the method then ends at block 360.

Figure 4:
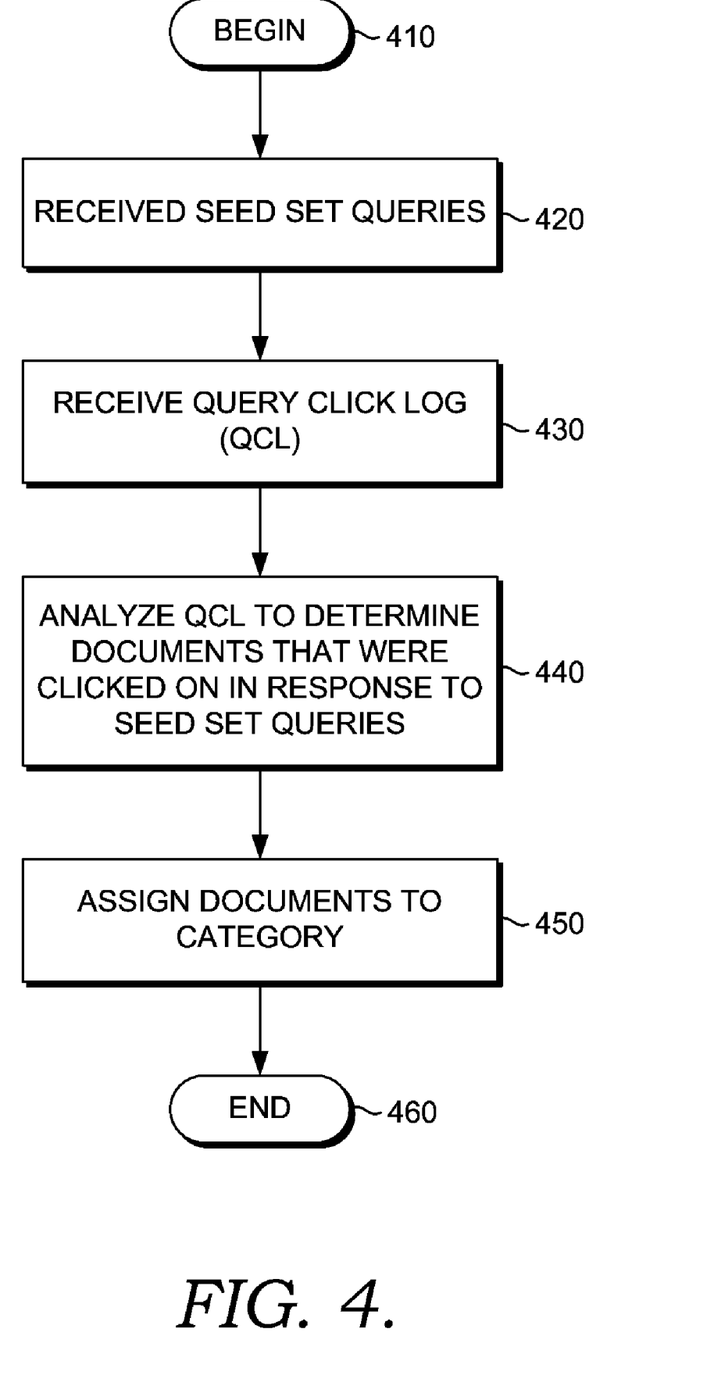
FIG. 4 is a flow diagram showing a method for analyzing a query click log to determine documents that that were clicked on in response to seed queries according to one embodiment of the present invention.

Turning now to FIG. 4, a flow diagram showing a method for analyzing a query click log to determine documents that that were clicked on in response to seed queries is depicted according to according one embodiment of the invention. In this embodiment, the method begins at block 410. Seed set queries are received at step 420. Seed set queries may be queries that are known to be representative of a particular category. In the examples presented above for the category of shoes, the query of "walking shoes" could be a representative seed query.

At block 430, a query click log is received. A query click log is a file that contains queries entered by at least one user and the subsequent links that were clicked in the search results in response to the queries. These links are referred to herein as documents. Query click logs may contain references to clicks on multiple documents for each query, such that one query is associated with more than one document. A query click log may also contain a field representing how many times a user clicked on a particular document in response to a query. In one embodiment, the query click log may also contain the queries of a plurality of users, and be organized in such a fashion as queries are represented in aggregate and not attributed to a particular individual user. In this embodiment a query click log would then contain three fields for each query, the first field would be the query itself, the second would be the documents clicked on in response to query, and the third would indicate how many times each document was clicked on in response to the query. In alternative embodiments, a plurality of query click logs may received in block 430.

At block 440, the query click log is analyzed to determine which documents were clicked in response to seed queries received in block 420. This is accomplished by comparing the seed set queries to queries in the query click log to determine which documents were clicked in response to the queries. In one embodiment, the documents clicked in response to the seed queries are deemed to be representative of the category and are assigned to the category in block 450. The remaining documents and their respective entries in the query click log that did not result in a click on a seed set document are determined to not be representative of the category, and are therefore not assigned to the category. In this embodiment, the method then ends at block 460.

Figure 5:
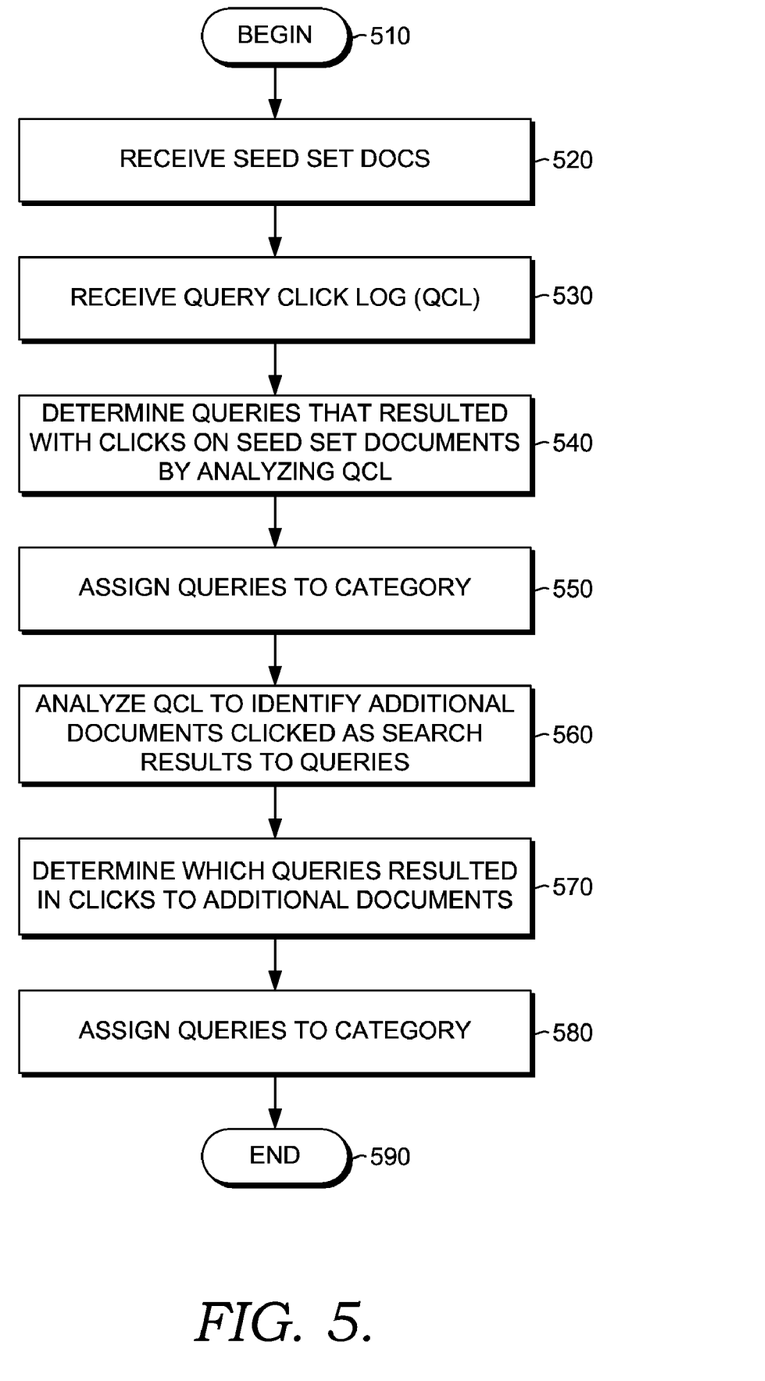
FIG. 5 is a flow diagram showing a method for generating a keyword list in accordance with another embodiment of the present invention.

Turning to FIG. 5, a flow diagram showing a method for query classification is depicted according to an alternative embodiment of the invention. The method begins at step 510. Seed set documents are received at step 520. Seed set documents may be documents that are known to be representative of a particular category. For instance, take the category of personal computers, the document "computers.com" would serve as a seed document. Multiple seed documents may be received in order to increase the likelihood of generating a comprehensive keyword list. In this example, "computing.com" would also serve as a seed document. Although not depicted in FIG. 5, seed queries may also be received at step 520. Seed queries are similar to seed documents in that they are representative of a category. In the examples presented above for the category of personal computers, the query of "home computers" would be a representative seed query. Seed queries, however, are not required though for the invention to function as described herein. Both seed queries and seed documents may be received from an advertiser and hence be generated by an advertiser. In alternative embodiments, the seed documents and queries may be received from an advertising service that suggests them to an advertiser, or they may be generated by a search engine service. In addition, the seed documents and queries may be generated by any number of methods not disclosed herein.

In block 530, a query click log is received. A query click log is a file that contains queries entered by at least one user and the subsequent links that were clicked on in the search results in response to the query. These links are referred to as documents. Query click logs may contain references to clicks on multiple documents for each query, such that one query is associated with more than one document. A query click log may also contain a field representing how many times a user clicked on a particular document in response to a query. In one embodiment, the query click log may also contain the queries of a plurality of users, and be organized in such a fashion as queries are represented in aggregate and not attributed to a particular individual user. In this embodiment a query click log would then contain three fields for each query, the first field would be the query itself, the second would be the documents clicked on in response to query, and the third would indicate how many times each document was clicked on in response to the query. In alternative embodiments, a plurality of query click logs may be received in block 530.

In block 540, the query click log is analyzed to determine which queries resulted with clicks on the seed set documents. This is accomplished by comparing the seed set documents to documents that were clicked on in response to the queries in the query click logs. In one embodiment, if the seed set documents and the documents clicked on in response to queries are identical, the queries are deemed to be representative of the category and are assigned to the category in block 550. The remaining queries and their respective entries in the query click log that did not result in a click on a seed set document are determined to not be representative of the category, and are therefore not assigned to the category.

At block 560, the query click log is analyzed again to determine which additional documents are associated with the queries that were newly assigned to the category in step 550. Documents are deemed to be associated with queries if the documents were clicked on in response to the particular query. In block 570, it is then determined which queries resulted in clicks on the additional documents identified in step 560. The determined queries from block 570 are then assigned to the category in block 580. Although not depicted in FIG. 5, queries that did not result in clicks on the seed documents or clicks on the additional documents determined in block 560 are not assigned to the category in block 580. Additionally, although not shown in FIG. 5, in some embodiments, seed documents and/or additional documents may also be assigned to the category.

Figure 6:
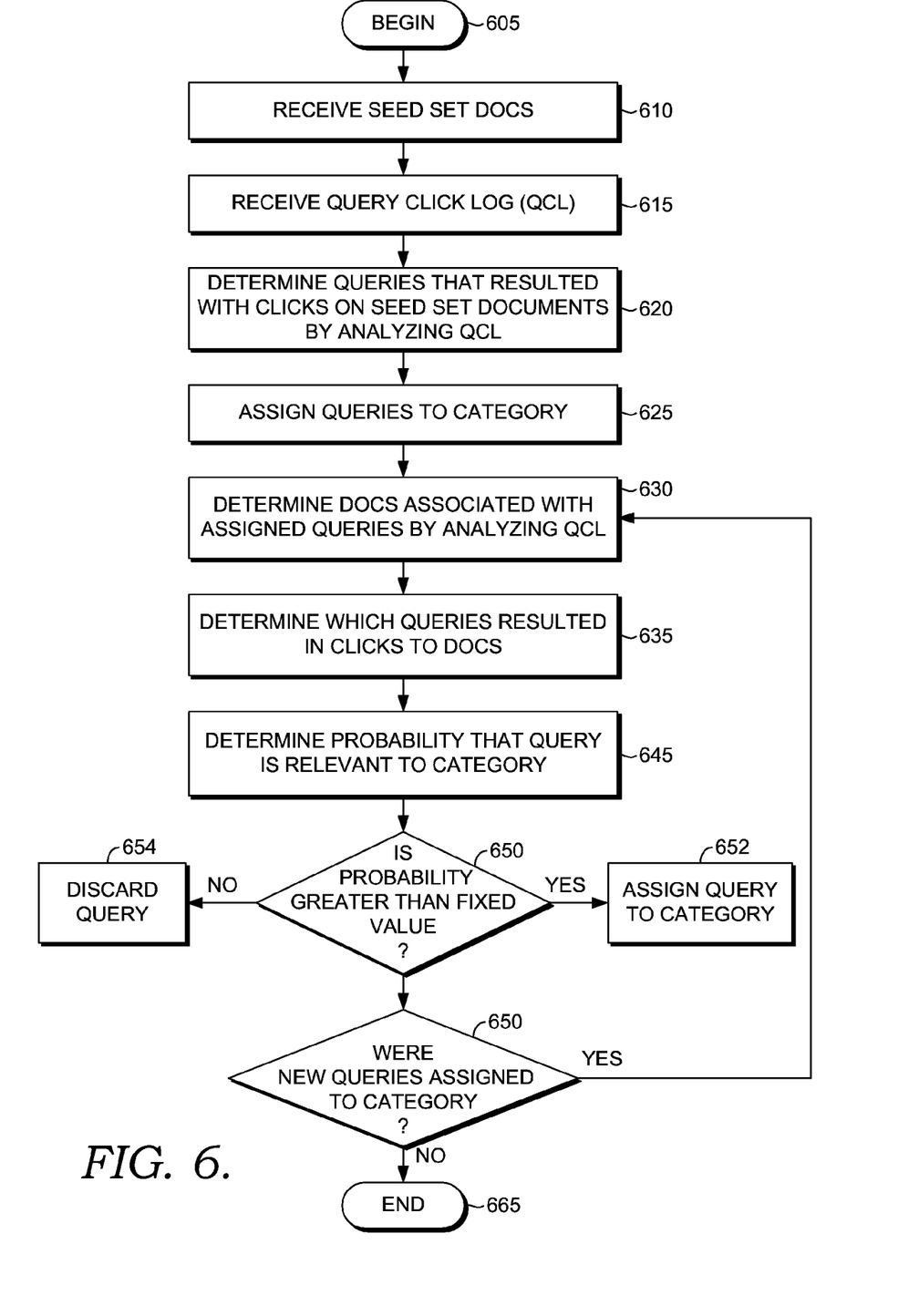
FIG. 6 is a flow diagram showing a method for determining categories for assignment to a query in accordance with a further embodiment of the present invention.

Turning to FIG. 6, a flow diagram showing a method for determining categories for assignment to a query is depicted according to another embodiment of the present invention. The method begins at block 605 with the receiving of seed set documents at block 610. Seed set documents may be documents that are known to be representative of a particular category. For instance, take the category of personal computers, the document "computers.com" would serve as a seed document because it can be assumed to be representative of the category. Multiple seed documents may be received in order to increase the likelihood of generating a comprehensive keyword list. In this example, "computing.com" would also serve as a seed document.

In block 615, a query click log is received. A query click log is a file that contains queries entered by at least one user and the subsequent documents that were clicked on in the search results in response to the query. Query click logs may contain references to clicks on multiple documents for each query, such that one query is associated with more than one document. A query click log may also contain a field representing how many times a user clicked on a particular document in response to a query. In alternative embodiments, the query click log may also contain the queries of a plurality of users, and be organized in a manner that queries are represented in the aggregate and not attributed to a particular individual user. In this embodiment a query click log would then contain three fields for each query, the first field would be the query itself, the second would be the documents clicked on in response to query, and the third would indicate how many times each document was clicked on in response to the query. In alternative embodiments, a plurality of query click logs may be received in block 615.

In block 620, the query click log is analyzed to determine which queries resulted with clicks on the seed set documents. This is accomplished by comparing the seed set documents to documents that were clicked on in response to the queries in the query click logs. In one embodiment, if the seed set documents and the documents clicked on in response to queries are identical, the queries are deemed to be representative of the category and are assigned to the category in block 625. The remaining queries and their respective entries in the query click log that did not result in a click on a seed set document are determined to not be representative of the category, and are therefore not assigned to the category at this point in the method.

At block 630, the query click log is analyzed again to determine which additional documents are associated with the queries that were newly assigned to the category in step 625. Documents are deemed to be associated with queries if the documents were clicked on in response to the particular query. In block 635, it is then determined which queries resulted in clicks on the additional documents identified in step 630. These queries are then passed to block 645 to determine if they are relevant to category. Although not depicted in FIG. 6, queries that did not result in clicks on the seed documents or clicks on the additional documents determined in block 630 are discarded from further analysis at this point.

At block 645, the probability that the newly identified query is relevant to the category is determined. At block 650, the determination is made if probability is greater than a fixed value. If the probability is greater than a fixed value the query is assigned to the category at block 652, while if the probability is less than a fixed value, the query is discarded at block 654. The probabilities are generally calculated by analyzing all of the clicked documents for a perspective query. The proportion of the clicked documents that are associated with the category is determined. If the proportion of the clicked documents associated with the category is high, there is a higher probability that the query is associated with the category and should therefore be assigned to the category. The converse would hold true as well. If a small proportion of the clicked documents are associated with the category, there is a lower probability that the query is associated with the category. In alternative embodiments, it may be determined if the probability is within a given range of probabilities, and if the determined probability is outside of the range the query is discarded, while if the probability is within the range the query is assigned to the category.

In block 660, it is determined if new queries were assigned to the category. If new queries were assigned to the category, the method returns to block 630 to analyze the query click log to determine documents associated with the newly assigned queries to the category. Although not shown in FIG. 6, in addition to assigning queries to the category, documents may also be assigned to the category in some embodiments of the invention through a similar iterative method as depicted in FIG. 6 and described herein. Additionally, documents and queries may be assigned to the category in a combined method.

In some embodiments, the probability that a document and/or a query is relevant to a category may be determined. Additionally, in some embodiments, the probabilities are stored in association with the corresponding documents and/or queries. In further embodiments, a seed document and/or seed query may be assigned a predetermined probability, such as 1. In other embodiments, the probability for a document and/or query may be calculated. One method of calculating the probability is depicted in the following algorithms. The probability of a query (q) belonging to a category (c) during an iteration as discussed above is calculated in terms of the probability of all its clicked documents (d) in being in category (c) during the previous iteration and (f) represents the number of times that users issued the query (q) and to the search engine and clicked on the document (d). The formula for this calculation is:

$$P^i(q,c) = \frac{\sum_{(d,q,f) \in \text{Log}} f \cdot P^{i-1}(d,c)}{\sum_{(d,q,f) \in \text{Log}} f}$$

The probability of a document (d) that is not in the seed set of documents belonging to the category (c) during the previous iteration is calculated in terms of the probability of all the associated queries during the same iteration. The formula for this is:

$$P^i(d, c) = \frac{\sum_{(d,q,f) \in \text{Log}} f \cdot P^i(q, c)}{\sum_{(d,q,f) \in \text{Log}} f}$$

The algorithm for keyword generation and subsequent query classification is presented below in a mathematical form. The input is a click log (L), consisting of triples <q,u,f>, where q is a query, u is the URL of a document, a f is the number of times that users issued query q to the search engine and clicked on URL u in response thereof. The input also contains a seed set (S), comprising of pairs <q,c> where q is a query and c is a category, although in alternative embodiments of the invention, the seed set does not contain a query. The output for the algorithm is a set QC comprising of triples <q,c,p>, where q is a query, c is a category, and p is a real number such that 0<=p<=1, and a set DC consisting of triples <d,c,p>, where d is a document, c is a category, and p is a real number such that 0<=p<=1. P is probability that the document or query is correctly assigned to category c. Additionally, the probability of a seed document being associated with a category is defined as P being equal to 1, and the probability of a seed query being associated with a category is also defined as P being equal to 1. Documents or queries have no probability of being associated to a category are defined as P being equal to 0.

For each (d,c) in the seed set S, P(d,c)=1.

The following algorithms are repeated until a fixed point is reached. In some embodiments of the invention, a fixed may be an iteration where all probabilities remain the same.

For each query q and for each category c $$P(q, c) = \frac{\sum_{(d,q,f) \in L} f \cdot P(d, c)}{\sum_{(d,q,f) \in L} f}$$

For each document d such that d is not in S, and for each category c $$P(d, c) = \frac{\sum_{(d,q,f) \in L} f \cdot P(q, c)}{\sum_{(d,q,f) \in L} f}$$

Having described particular embodiments of the invention directed to query and document classification to particular categories, practical applications of the query and document classifications are now described. Generally, embodiments of the present invention utilize the query and/or document classifications described above in the generation of keyword lists and to aid in providing more relevant search results to users of a search engine.

Figure 7:
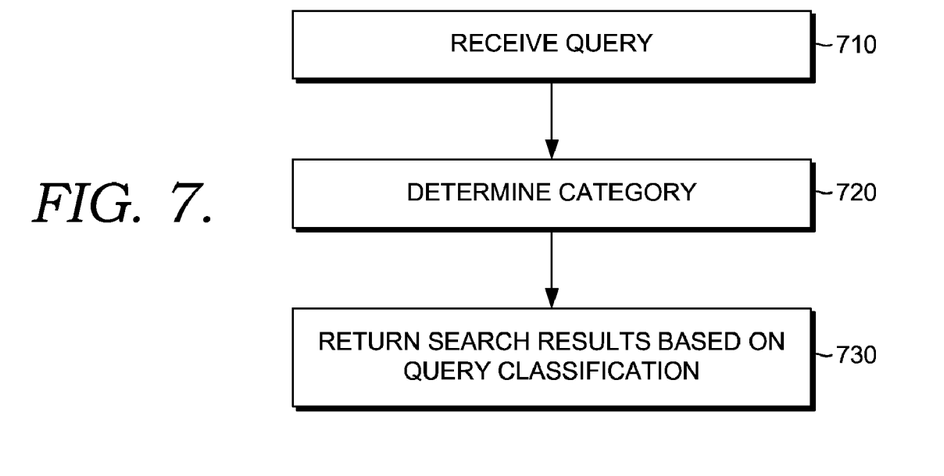
FIG. 7 is a flow diagram depicting the return of search results relevant to a category according to an embodiment of the present invention.

As noted previously, some embodiments employ query classification to facilitate providing search results for a search query submitted to a search engine. For instance, with reference now to FIG. 7, a flow diagram is presented depicting the return of search results relevant to a category in accordance with one embodiment of the present invention. At block 710, a query is received. In some embodiments of the invention, a query is received from a user and the query typically is a word or short phrase. In block 720, a category will be determined that is representative of the query. In some embodiments, the category may be determined based on comparing the query with information regarding query classification. For instance, methods such as those described with reference to FIGS. 3-6 may provide information associating various queries with various categories. By comparing the received query with the information, a category for the query may be determined. Based on the category for the query, relevant search results are returned in block 730.

A variety of methods may be employed for using query classification to select search results. For instance, in some embodiments, one or more documents that have been classified as belonging to the same category identified for the received query may be returned as search results. The categories of these documents may have been determined based on the methods depicted in FIGS. 3, 4, 5, and 6. In some cases, a query may be associated with multiple categories, and documents for each category may be returned as search results. For instance, in one embodiment of the invention a query may be received for "jaguar." From the query itself, it is not clear if the user is seeking information for the make of automobile by the same name, or the species of animal. Information from the query click log could be used to determine the documents that users had clicked in response to similar queries for "jaguar." It may then be determined that 80% of users clicked on documents relating to the make of automobile by the same name, while 15% click on documents relating to the animal, while the remaining 5% clicked on documents for the professional football team with a mascot by the same name. Search results could then be returned in proportion to the percentages calculated above. In alternative embodiments, the search results could also be ranked in accordance with the percentages calculated so that search results relating to categories with higher calculated percentages are ranked higher than other search results. Results with a higher ranking would be presented to a user as being higher in the list of returned search results.

In other embodiments, different ranking rules may be employed for performing searches for queries of different categories. For instance, turning now to FIG. 8, a block diagram is presented depicting the return of search results based on ranking rules for a category in accordance with an embodiment of the present invention. As in FIG. 7, a query is received from a user at block 810. In embodiments of the invention, a query is received from a user that is a word or short phrase. In block 820, a category is determined that is representative of the query. As indicated above, a list of queries and respective categories may be generated using methods such as those described with reference to FIGS. 3-6 and may be employed to determine a category for the query.

Figure 8:
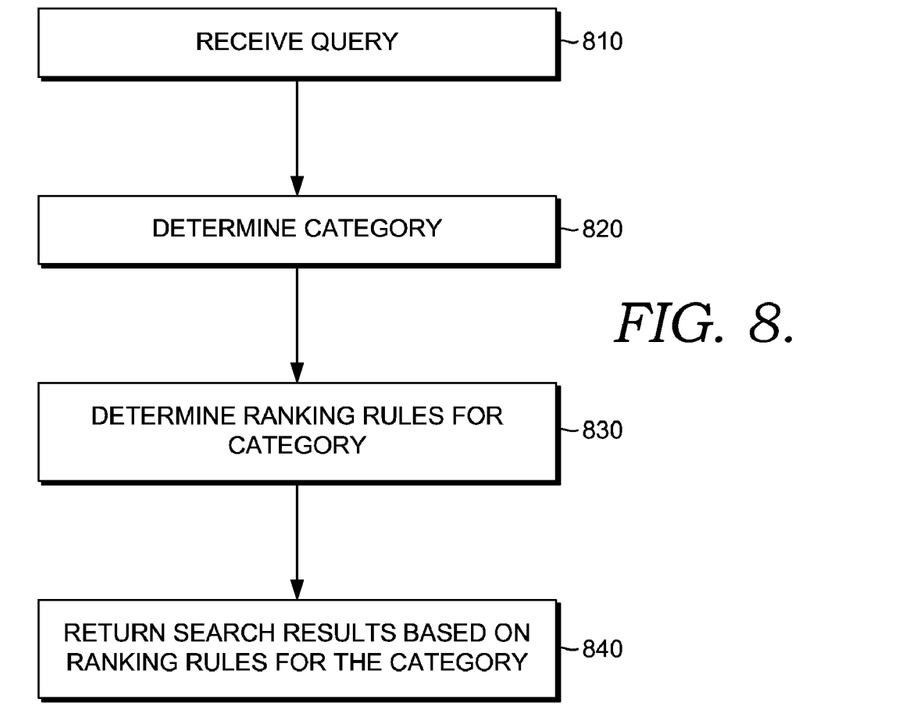
FIG. 8 is a flow diagram depicting the return of search results based on ranking rules for a category in accordance with an embodiment of the present invention.

Ranking rules for the category are determined in block 830. Generally, different ranking rules may be defined for each category and specify how ranking of search results should be performed for queries of each category. In block 840, search results are returned to the user by applying the ranking rules determined at block 830.

Figure 10:
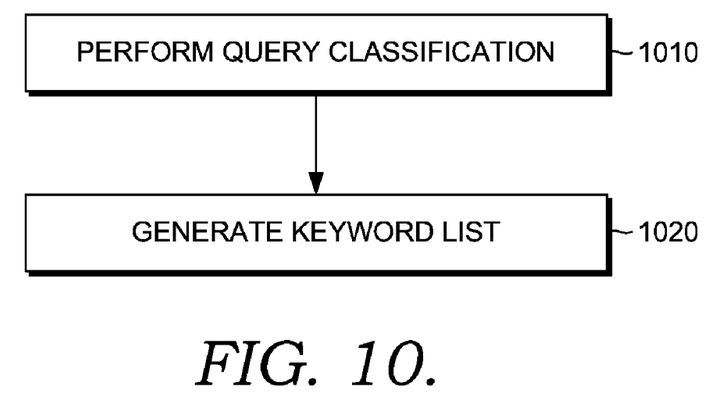
FIG. 10 is a flow diagram depicting the performance of query classification and generation of a keyword list according to an embodiment of the present invention.

With reference now to FIG. 10, a flow diagram depicting the performance of query classification and generation of a keyword list according to an embodiment of the present invention is presented. The steps of query classification are performed in block 1010. The query classification may be performed as in the embodiments described in FIGS. 3, 4, 5, and 6 above. A keyword list is then generated in block 1020 based on the query classification performed in block 1010. A keyword list is generated based on the queries assigned to the category. A keyword list may contain one or more keywords. In some embodiments, the keywords may be the list of queries assigned to the category. In alternative embodiments, the keywords of the keyword list may be based on the queries assigned to the category. By way of example and not limitation, the queries assigned to the category could be truncated if the exceed a certain word or character limit. In other embodiments, the duplicate queries cold be removed from the keyword list.

Figure 9:
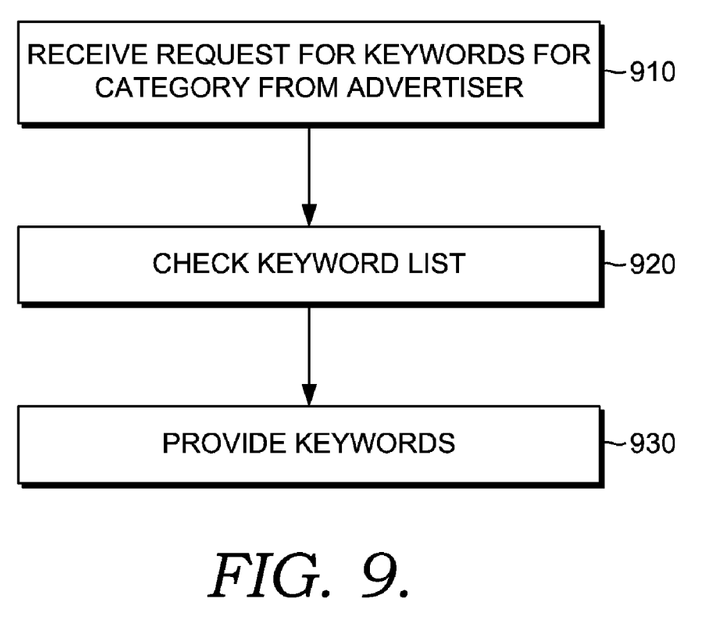
FIG. 9 is a flow diagram depicting the return of a keyword in response to a request for keywords for a category according to an embodiment of the present invention.

With reference now to FIG. 9, a block diagram is presented depicting the return of a keyword in response to a request for keywords for a category according to embodiments of the present invention. At block 910, a request for keywords for a category is received from an advertiser. The advertiser may define their category in a generic sense, such as "shoes", or it may be more specific, such as "cordovan dress shoes." The advertiser may also be assisted in defining their category by a third party, such as an advertising agency or a search engine service. A keyword list is checked in block 920 for keywords that are assigned to that category, and at least one keyword is provided to the advertiser in block 930. The keyword list may be generated according to the methods depicted in FIGS. 3, 4, 5, and 6 above. In this manner, lists of keywords may be pre-generated for specific categories that are more commonly encountered, or they may be generated on demand for less common categories. Additionally, the advertiser may request that a new list of keywords be generated based on the most recent query click logs available. In alternative embodiments, the request for keywords may be made by an entity other than an advertiser. This might be the case if an entity desired to have a particular message displayed in response to a query for particular keywords. These messages could be in the form of public service messages or the like.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable media having computer-executable instructions embodied thereon that, when executed, facilitate a method of determining that a query is relevant to a category of information, the method comprising:
    associating a seed document with the category, wherein the seed document is trusted to be relevant to the category;
    receiving an identification of a query that was previously input to a search engine, wherein, when a search-result document was presented in response to the query, the search-result document was selected;
    determining that the search-result document matches the seed document; and
    based on the search-result document matching the seed document, inferring that the query is relevant to the category.

2. The one or more computer-readable media of claim 1, the method further comprising:
    receiving a search query submitted by a user;
    determining that the search query matches another query deemed relevant to the category; and
    based on the search query matching the other query, classifying the search query under the category.

3. The one or more computer-readable media of claim 2, wherein the method further comprises, based on the classifying the search query under the category, inferring that a search result associated with the category is relevant to the search query, and wherein the search result is provided in response to the search query.

4. The one or more computer-readable media of claim 2, wherein the method further comprises:
    identifying one or rules for ranking search results based on the category; and
    providing ranked search results for the search query based on the one or more rules.

5. The one or more computer-readable media of claim 2, wherein the method further comprises:
    providing search results for the search query, wherein at least a portion of the search results correspond with one or more documents associated with the category.

6. The one or more computer-readable media of claim 1, wherein the method further comprises:
    determining, from a query log of the query, another search-result document that was selected; and
    determining that the other search-result document matches another seed document known to be relevant to the category.

7. The one or more computer-readable media of claim 6, wherein the method further comprises:
    receiving a search query submitted by a user;
    determining that the search query matches another query deemed relevant to the category; and
    based on the search query matching the other query, providing the other search-result document as a search result.

8. The one or more computer-readable media of claim 1, wherein the method further comprises:
    generating a list of keywords for the category, wherein the keywords include the query.

9. One or more computer-readable media having computer-executable instructions embodied thereon that, when executed, facilitate a method of determining that a query is relevant to a category of information, the method comprising
    associating a seed document with the category, wherein the seed document is trusted to be relevant to the category;
    receiving an identification of a query that was previously input to a search engine, wherein, when a search-result document was presented in response to the query, the search-result document was selected;
    determining that the search-result document matches the seed document;
    based on the search-result document matching the seed document, deeming the query to be relevant to the category;
    receiving a request to provide a keyword that is relevant to the category; and
    providing the query as the keyword that is relevant to the category.

10. The one or more computer-readable media of claim 9, wherein the seed document contains content that describes the category, which an entity desires to have its message displayed in conjunction with.

11. The method of claim 10, wherein the entity is an advertiser and the message is an advertisement.

12. The one or more computer-readable media of claim 11, wherein the keyword is provided to the advertiser.

13. The one or more computer-readable media of claim 12, wherein the advertiser purchases rights to have its advertisement displayed to a user when the user enters a search query containing the keyword.

14. The one or more computer-readable media of claim 13, wherein the search query entered by a user is received.

15. The one or more computer-readable media of claim 14, wherein the advertisement is displayed to the user in conjunction with search results returned by the search engine.

16. One or more computer-readable media having computer-executable instructions embodied thereon that, when executed, facilitate a method of determining that a query is relevant to a category of information, the method comprising:

associating a set of seed documents with the category, wherein each seed document of the set of seed documents is trusted to be relevant to the category;

receiving an identification of a query that was previously input to a search engine, wherein, when search-result documents were presented in response to the query, a portion of the search-result documents were selected;

determining that a percentage of the portion includes a search-result document that matches a seed document; and when the percentage exceeds a threshold percentage, deeming the query to be relevant to the category.

\* \* \* \* \*